(12) United States Patent
Griessbach

(10) Patent No.: US 7,310,746 B2
(45) Date of Patent: Dec. 18, 2007

(54) METHOD FOR TRANSMITTING MESSAGES BETWEEN BUS USERS

(75) Inventor: Robert Griessbach, Weyarn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 453 days.

(21) Appl. No.: 10/805,326

(22) Filed: Mar. 22, 2004

(65) Prior Publication Data

US 2004/0193954 A1    Sep. 30, 2004

Related U.S. Application Data

(63) Continuation of application No. PCT/EP02/10501, filed on Sep. 19, 2002.

(30) Foreign Application Priority Data

Sep. 21, 2001 (DE) .................. 101 46 695

(51) Int. Cl.
*G06F 11/00* (2006.01)

(52) U.S. Cl. .................. 714/18; 714/31; 714/56

(58) Field of Classification Search .................. 714/18, 714/742, 31, 56
See application file for complete search history.

(56) References Cited

U.S. PATENT DOCUMENTS

| | | | |
|---|---|---|---|
| 4,573,154 A * | 2/1986 | Nakata et al. ............... 714/750 |
| 4,583,224 A * | 4/1986 | Ishii et al. .................... 714/10 |
| 4,607,365 A * | 8/1986 | Greig et al. .................... 714/4 |
| 4,849,979 A * | 7/1989 | Maccianti et al. ............. 714/41 |
| 5,423,024 A * | 6/1995 | Cheung ........................ 714/11 |
| 5,452,443 A * | 9/1995 | Oyamada et al. .............. 714/10 |
| 5,631,910 A | 5/1997 | Nozuyama et al. |
| 5,993,055 A * | 11/1999 | Williams ..................... 714/732 |
| 6,031,823 A | 2/2000 | Hormel et al. |
| 6,272,113 B1 * | 8/2001 | McIntyre et al. ........... 370/248 |
| 6,282,469 B1 | 8/2001 | Rogers et al. |
| 6,367,028 B1 * | 4/2002 | Schmalzried .................. 714/1 |
| 6,601,195 B1 * | 7/2003 | Chirashnya et al. .......... 714/43 |
| 6,604,038 B1 * | 8/2003 | Lesesky et al. ............... 701/49 |
| 6,704,887 B2 * | 3/2004 | Kwiat et al. .................. 714/10 |
| 6,728,603 B2 * | 4/2004 | Pruzan et al. .................. 701/1 |
| 6,769,078 B2 * | 7/2004 | Barenys et al. ............... 714/43 |
| 6,928,583 B2 * | 8/2005 | Griffin et al. ................. 714/11 |
| 7,047,440 B1 * | 5/2006 | Freydel et al. ................ 714/11 |
| 7,171,510 B2 * | 1/2007 | Haycock et al. ............ 710/310 |
| 2002/0083376 A1 * | 6/2002 | Self et al. ...................... 714/56 |
| 2002/0133273 A1 * | 9/2002 | Lowrey et al. ............... 701/29 |
| 2002/0197988 A1 * | 12/2002 | Hellaker ..................... 455/423 |

(Continued)

FOREIGN PATENT DOCUMENTS

DE    37 17 012 A1    12/1988

(Continued)

*Primary Examiner*—Scott Baderman
*Assistant Examiner*—Loan Truong
(74) *Attorney, Agent, or Firm*—Crowell & Moring LLP

(57) ABSTRACT

A method is provided for transmitting messages between bus users that are each linked with a communication bus for the purpose of exchanging messages and with a diagnostic device for detecting the failure of the communication bus. In a diagnostic operation mode that is different from the normal operation mode, the bus user receiving the message is requested by the diagnostic device to output the message to the communication bus, thereby diagnosing a message transmission between two bus users.

10 Claims, 1 Drawing Sheet

U.S. PATENT DOCUMENTS

| | | | |
|---|---|---|---|
| 2003/0179777 A1* | 9/2003 | Denton et al. | 370/503 |
| 2004/0110472 A1* | 6/2004 | Witkowski et al. | 455/41.2 |
| 2004/0203379 A1* | 10/2004 | Witkowski et al. | 455/41.2 |
| 2005/0090279 A9* | 4/2005 | Witkowski et al. | 455/550.1 |
| 2006/0083173 A1* | 4/2006 | Jordan et al. | 370/242 |

FOREIGN PATENT DOCUMENTS

| | | |
|---|---|---|
| DE | 38 41 424 C2 | 6/1989 |
| DE | 38 42 258 C3 | 6/1989 |
| DE | 38 10 367 A1 | 10/1989 |
| DE | 39 11 876 A1 | 10/1989 |
| DE | 198 37 242 C1 | 3/2000 |
| EP | 0 307 191 B1 | 3/1989 |
| FR | 2 636 151 | 3/1990 |

* cited by examiner

METHOD FOR TRANSMITTING MESSAGES BETWEEN BUS USERS

CROSS-REFERENCE TO RELATED APPLICATIONS

This application is a continuation of PCT Application No. PCT/EP02/10501 filed on Sep. 19, 2002.

BACKGROUND AND SUMMARY OF THE INVENTION

The invention relates to a method of transmitting messages between bus users which are each connected with a communication bus for exchanging messages, and having a diagnostic device for a disturbance of the communication bus.

The necessity of mutually connecting several bus users, such as control units and sensors, increasingly exists in modern vehicles. Such control units are, for example, an electronic engine control and the control of an automatic transmission. In order to read out faults for such a control unit during a repair shop stay, it is known from German Published Patent Application DE 39 34 974 A1 to arrange a diagnostic bus as a diagnostic device in the vehicle. One bus line is used for the transmission of control signals and the other line is provided as a status line. This results in considerable constructive expenditures just for the diagnosis.

From German Patent Document DE 19837242 C, a method of the above-mentioned type is known, in the case of which a data transmission also takes place by way of a separate diagnostic bus in the event of a fault. The diagnostic bus represents a redundant data bus. As in German Patent Document DE 39 34 974 A1,considerable constructive expenditures are also required here. Furthermore, a possibly occurring fault, as a rule, cannot be seen in the data transmission because the diagnostic bus will then automatically "intervene". If, as in the case of German Patent Document DE 39 34 974 A1,the status of the transmitted message is checked, the status does not change in the event of a fault.

It is an object of the invention to provide a method of transmitting messages between bus users of a vehicle, which permits a reliable diagnosis of a disturbance in the data transmission, specifically in the case of a data transmission between two bus users, without any special expenditures.

This object is achieved by a method of transmitting messages between bus users which are each connected with a communication bus for exchanging messages, and having a diagnostic device for a disturbance of the communication bus, wherein in a diagnostic operating mode differing from the normal operation, for the diagnosis of a message transmission between two bus users, the bus user receiving the message is asked by the diagnostic device to output the message on the communication bus. Advantageous further developments of the invention are described and claimed herein.

In an operating mode which differs from the normal operation, using the diagnostic device, the bus user normally receiving the message can be caused, in a targeted manner, to output the message to the communication bus. If the bus user does not do so, or if the message is damaged, a disturbance is present. However, it can then not yet be determined where the disturbance is situated.

For localizing the source of the disturbance, a third bus user not participating in this message transmission in the normal operation, can be caused in the diagnostic operation to receive this message. The status of this message for the three bus users is subsequently read out. If the fault is present in the sender, the two receiving bus users have the same status ("no message present"). If the fault is in the receiver, the two receivers have different statuses.

The method according to the invention is particularly suitable for a bilateral message transmission. For messages which are transmitted in the normal operation between more than two bus users, in the operating mode differing from the normal operation, the addition of another bus user is no longer required. Here, it is sufficient for the status of this message to be read out for all bus users participating in this message transmission. A fault of the sender does not change the message status of the receivers. A fault in a receiver can be recognized by the different status of this receiver in comparison to the other receivers.

Other objects, advantages and novel features of the present invention will become apparent from the following detailed description of the invention when considered in conjunction with the accompanying drawings.

BRIEF DESCRIPTION OF THE DRAWING

The FIGURE shows the typical architecture of a data bus system in the vehicle.

DETAILED DESCRIPTION OF THE DRAWINGS

Figure 1:
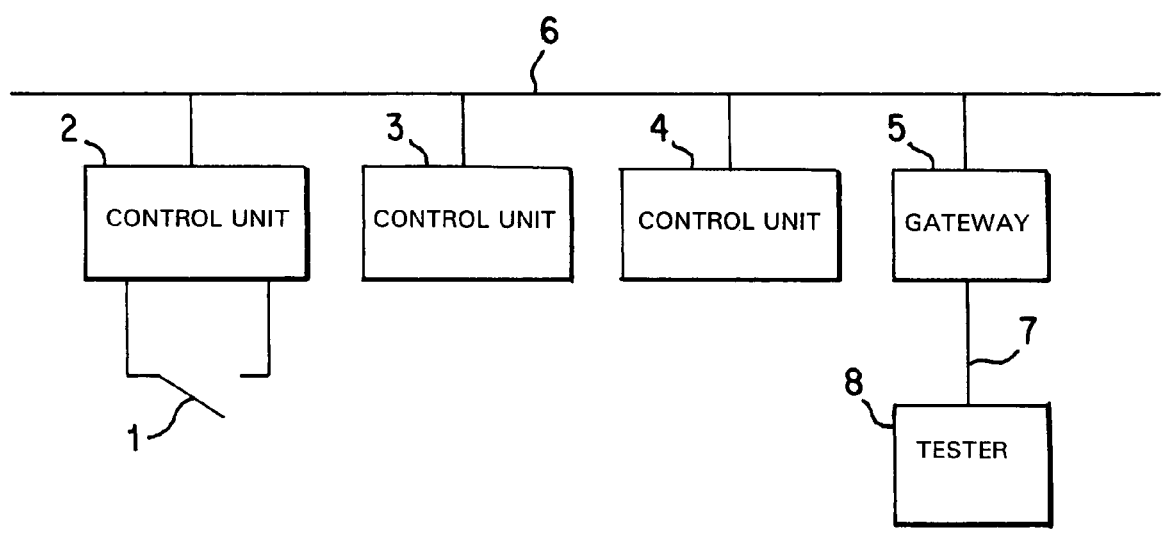

Referring to the FIGURE, by means of the data bus, the condition of a switch 1, which is connected to a control unit 2, is to be reported to another control unit 3. The control units 2 and 3, as well as another control unit 4, are connected to a communication bus 6, and likewise a gateway 5. By way of the gateway 5, each control unit 2, 3, 4 can be addressed by way of a diagnostic tester 8.

The switch 1 is read in by the control unit 2 and the switch condition information is transmitted to the control unit 3 by way of the bus system. The tester 8 can query the condition of the switch from the control unit In addition, the status of the message transmitted by way of the bus 6 can be queried from the control unit 3.

In the event of a fault, the status of the switch 1 is correctly detected in control unit 2 but not in control unit 3. It can therefore not be determined whether the message concerning the condition of the switch 1 is not placed on the bus by control unit 2 or whether control unit 3 does not receive the message correctly.

According to the invention, a diagnostic device (tester 8) is connected by way of the gateway 5 and a diagnostic operation is set. In this case, control unit 3 is queried in a targeted manner about the message of control unit 2. If control unit 3 has received this message and is working without any disturbance, it places the message on the communication bus. The tester receives the message and determines that the overall system is working properly.

Correspondingly, in the case of several messages, which also originate from several senders (control units and the like), the receiver or receivers can be caused to output the respective message which is of interest. The overall system can thereby be tested in a targeted manner.

If a fault occurs which, in the above-mentioned example, can be detected by means of the absent, or only partially present, message of control unit 2, control unit 4 is caused to also receive the switch condition information. By way of the gateway, the message statuses of control units 2 to 4 are queried. If the statuses of control units 3 and 4 are the same, the fault is present in control unit 2; if they differ (that is, control unit 4 has received the message and not control unit 3), the fault is present in control unit 3.

In order to generate no additional expenditures for the diagnostic function in the case of messages sent from one control unit to several control units, ideally the control units which receive the message anyhow, which is to be examined, are utilized for this diagnostic function.

In that case, the tester 8 has to contain a table which shows which signals are received by which control units. If all control units which actually are to be addressed receive no message, the fault is with the sender; otherwise, it is with that receiver which, in contrast to the other receivers, receives no message.

It thereby becomes possible to continuously follow signals in bus systems by means of existing shop devices and without any high expenditures and to precisely define the site of the fault.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of transmitting messages between a plurality of bus users, each of which is connected with a communication bus for exchanging messages, the method comprising the acts of:
   conducting a message transmission from a first bus user to a second bus user in a normal operation mode; and
   for diagnosing the message transmission, operating in a diagnostic operating mode that differs from the normal operation mode and includes the acts of:
   requesting, by a diagnostic device uninvolved in the message transmission during the normal operation mode, the second bus user to output on the communication bus the message transmission;
   detecting a disturbance when the diagnostic device does not receive the message transmission or receives a damaged message transmission from the second bus user via the communication bus; and
   determining, by the diagnostic device, whether a source of the disturbance is in the first bus user or in the second bus user.

2. The method according to claim 1, further comprising the acts of:
   in the diagnostic operating mode, causing a third bus user, different from the first and second bus users, to receive the message transmission to the second bus user when the second bus user does not output the message transmission or outputs a damaged message transmission; and
   comparing message statuses from the three bus users to determine the source of a disturbance.

3. The method according to claim 1, wherein messages are transmitted between more than two bus users, the method further comprising the act of reading-out the status of the message for a bus users participating in the message transmission in an operating mode differing from the normal operation.

4. The method according to claim 1, wherein the conducting includes conducting a message transmission from the first bus user to a plurality of bus users, and wherein the determining includes comparing message statuses for all bus users participating in the message transmission in an operating mode differing from the normal operation.

5. The method according to claim 3, wherein the bus users participating in the message transmission are read-out of a table.

6. The method according to claim 4, wherein the bus users participating in the message transmission are read-out of a table.

7. A diagnostic method for messages transmitted between first and second bus users, in which said bus users are each linked with a communication bus for purposes of exchanging messages and with a diagnostic device for detecting a failure of a message transmission, the method comprising:
   in a diagnostic operation mode that is different from a normal operation mode, requesting, by the diagnostic device, the second bus user to output to the communication bus a message transmission from the first bus user to the second bus user during the normal operation mode, thereby diagnosing the message transmission, wherein the diagnostic device is uninvolved in the message transmission during the normal operation mode.

8. The method according to claim 7, further comprising:
   in the diagnostic operation mode, causing a third bus user to receive the message transmission; and
   comparing message statuses from each of the three bus users to determine a source of the failure.

9. The method according to claim 8, further comprising:
   determining the source of the failure to be in the first bus user when the message statuses from the second and third bus users are the same; and
   determining the source of the failure to be in the second bus user when the message statuses from the first and third bus users are the same and the message status of the second bus user is different.

10. The method according to claim 2, wherein the comparing comprises:
    determining that the source of the disturbance is in the first bus user when the message statuses from the second and third bus users are the same; and
    determining that the source of the disturbance is in the second bus user when the message statuses of the first and third bus users are the same and the message status of the second bus user is different.

* * * * *